United States Patent
Chun

(10) Patent No.: US 8,643,790 B2
(45) Date of Patent: Feb. 4, 2014

(54) REMOTE CONTROLLER, IMAGE PROCESSING APPARATUS, AND IMAGING SYSTEM COMPRISING THE SAME

(75) Inventor: Min-kyung Chun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1456 days.

(21) Appl. No.: 11/541,640

(22) Filed: Oct. 3, 2006

(65) Prior Publication Data

US 2007/0075971 A1 Apr. 5, 2007

(30) Foreign Application Priority Data

Oct. 5, 2005 (KR) .................. 10-2005-0093476

(51) Int. Cl.
*H04N 5/44* (2011.01)

(52) U.S. Cl.
USPC ............ 348/734; 715/843; 715/853; 345/173

(58) Field of Classification Search
USPC .......................... 348/734; 345/173, 169, 158; 715/853–855, 843, 841
See application file for complete search history.

(56) References Cited

U.S. PATENT DOCUMENTS

| 4,825,209 A | 4/1989 | Sasaki et al. |
| 6,072,470 A * | 6/2000 | Ishigaki ........................ 345/158 |
| 6,292,188 B1* | 9/2001 | Carlson et al. ................ 715/854 |
| 7,062,453 B1* | 6/2006 | Clarke ......................... 705/26.3 |
| 7,109,974 B2* | 9/2006 | Kempisty ...................... 345/173 |
| 7,133,026 B2* | 11/2006 | Horie et al. .................. 345/163 |
| 7,168,050 B1* | 1/2007 | Kwon et al. .................. 715/843 |
| 2004/0090423 A1* | 5/2004 | Bisset .......................... 345/169 |

FOREIGN PATENT DOCUMENTS

| JP | 5-227578 A | 9/1993 |
| JP | 8-79847 A | 3/1996 |
| JP | 2002-112361 A | 4/2002 |
| KR | 1997-00014441 A | 3/1997 |
| KR | 1997-00032241 A | 6/1997 |
| KR | 1999-0048990 A | 7/1999 |
| KR | 10-2000-003677 A | 1/2000 |
| KR | 2003-0030485 A | 4/2003 |

* cited by examiner

*Primary Examiner* — Michael Lee
(74) *Attorney, Agent, or Firm* — Sughrue Mion, PLLC

(57) ABSTRACT

A remote controller for remotely controlling an image processing apparatus having a receiving unit, including: a sensing unit having a region for sensing a position value corresponding to user's contact and movement; a data processing unit for detecting information on a user's movement direction to convert it into a control signal capable of being outputted in accordance with the position value sensed; and a transmitting unit for transmitting the control signal to the image processing apparatus.

12 Claims, 5 Drawing Sheets

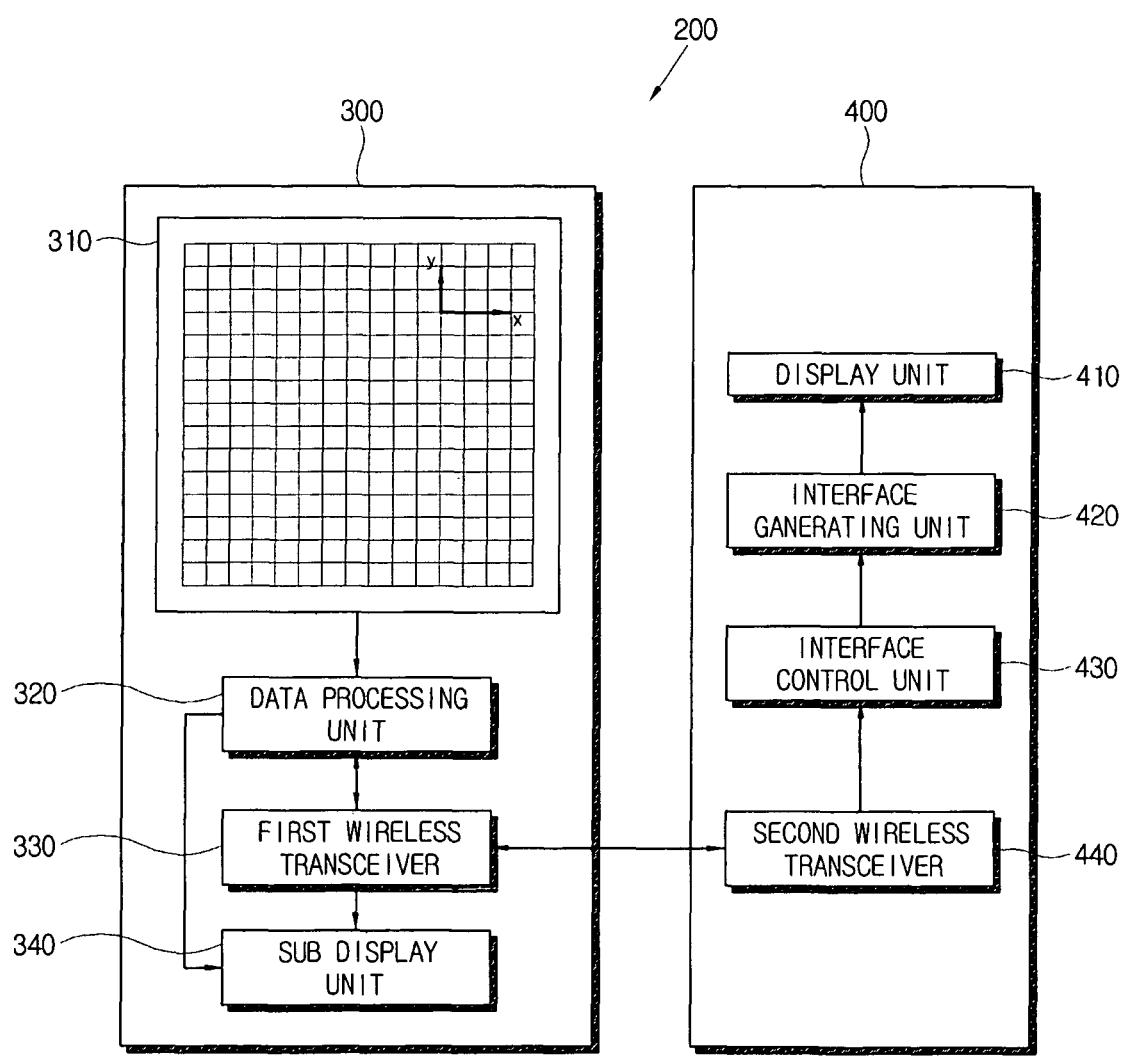

REMOTE CONTROLLER, IMAGE PROCESSING APPARATUS, AND IMAGING SYSTEM COMPRISING THE SAME

CROSS-REFERENCE TO RELATED APPLICATIONS

This application claims priority from Korean Patent Application No. 2005-0093476, filed on Oct. 5, 2005, in the Korean Intellectual Property Office, the disclosure of which is incorporated herein by reference.

BACKGROUND OF THE INVENTION

1. Field of the Invention

The present invention relates to a remote controller, an image processing apparatus and an imaging system comprising the same, and more particularly, to a remote controller, an image processing apparatus and an imaging system comprising the same which include a touch pad for enabling users to easily control a graphic user interface.

2. Description of the Related Art

A remote controller is used to control a graphic user interface displayed at an image processing apparatus. Generally, the graphic user interface corresponds to an OSD (on-screen display) in cases of a display device for use in a computer or a television, and recently it corresponds to a graphic window which is provided for user's selection in most electronic machines such as an air conditioner, a refrigerator, an electric fan and the like.

Considering the television as an example, the remote controller may include buttons for inputting Arabic numerals from 0 to 9, up/down and left/right moving buttons, and a plurality of buttons including a set button and a power button, and hot keys for moving to frequently used functions at one time.

Therefore, the user can reach a stage of displaying desirable function only through iterative operations of button input if he/she does not use the hot key. Further, there are problems in which it becomes difficult to control the remote controller as selection list related to the display apparatus capable of being controlled through the graphic user interface is increased, and the use of the remote controller itself can impose a burden on the user who is not accustomed with the electronic machines.

SUMMARY OF THE INVENTION

Accordingly, it is an aspect of the present invention to provide a remote controller, and an imaging system comprising the same which can easily control a graphic user interface in an image processing apparatus.

Additional aspects and/or advantages of the present invention will be set forth in part in the description which follows and, in part, will be obvious from the description, or may be learned by practice of the present invention.

The foregoing and/or other aspects of the present invention can be achieved by providing a remote controller for controlling a menu having a plurality of levels in an image processing apparatus comprising:
a sensing unit having a region for sensing positions in the region corresponding to a user's contact;
a data processing unit for receiving a value corresponding to the sensed positions and detecting a direction of the user's movement in the region; and
a transmitting unit for transmitting the detected direction of the user's movement to the image processing apparatus;
wherein the menu is controlled in a first manner in accordance with detection of the user's movement in a first direction and is controlled in a second manner in accordance with detection of the user's movement in a second direction.

According to an aspect of the present invention, the remote controller further comprises a liquid crystal panel for displaying a graphic user interface displayed at the image processing apparatus.

The foregoing and/or another aspects of the present invention can be achieved by providing an imaging system comprising an image processing apparatus and a remote controller for remotely controlling the image processing apparatus, wherein the remote controller comprises a sensing unit having a two-dimensional coordinate region for sensing a coordinate value corresponding to user's contact and movement, a data processing unit for detecting information on a user's movement direction to convert it into a control signal capable of being outputted in accordance with the coordinate value sensed, and a wireless transmitting unit for wireless-transmitting the control signal to the image processing apparatus; the image processing apparatus comprises a wireless receiving unit for wireless-receiving the control signal, an interface generating unit for generating a graphic user interface, a display unit for displaying the graphic user interface generated, and an interface control unit for controlling the interface generating unit to display the graphic user interface corresponding to the control signal received on the display unit.

According to an aspect of the present invention, the remote controller further comprises a sub display unit for displaying the graphic user interface displayed on the display unit.

According to an aspect of the present invention, the remote controller further comprises a wireless receiving unit for wireless-receiving a signal for the graphic user interface.

According to an aspect of the present invention, the image processing apparatus further comprises a wireless transmitting unit for wireless-transmitting a signal for the graphic user interface.

According to an aspect of the present invention, the sub display unit is a liquid crystal panel.

According to an aspect of the present invention, the graphic user interface comprises a plurality of selection lists, and the selection list is activated in accordance with the user's movement.

According to an aspect of the present invention, the selection list activated is selected if the sensing unit senses the user's contact with a certain coordinate region during a prescribed time period.

According to an aspect of the present invention, the graphic user interface comprises a plurality of selection lists including at least one sub list, and the graphic user interface displays a lower-level list of the selection list displayed at present if the sensing unit senses that the coordinate value is moved in a first direction, and displays a higher-level list of the selection list displayed at present if the sensing unit senses that the coordinate value is moved in a second direction opposite to the first direction.

According to an aspect of the present invention, the graphic user interface comprises a plurality of selection lists, and the remote controller further comprises a hot button for displaying a selection list on the display unit.

The foregoing and/or another aspects of the present invention can be achieved by providing an image processing apparatus which is remotely controlled by an external remote controller outputting a control signal generated by user's contact and movement with a predetermined sensing unit, comprising: a wireless receiving unit for wireless-receiving the control signal outputted from the remote controller; an interface generating unit for generating the graphic user interface; a display unit for displaying the graphic user interface generated; and an interface control unit for controlling the interface generating unit to display the graphic user interface corresponding to the control signal received on the display unit.

According to an aspect of the present invention, the graphic user interface comprises a plurality of selection lists, and the selection list is activated in accordance with the user's movement.

According to an aspect of the present invention, the selection list activated is selected if the sensing unit senses the user's contact with a prescribed region during a prescribed time period.

According to an aspect of the present invention, the graphic user interface comprises a plurality of selection lists including at least one sub list, and the graphic user interface displays a lower-level list of the selection list displayed at present if the sensing unit senses that the user moves in a first direction, and displays a higher-level list of the selection list displayed at present if the sensing unit senses that the user moves in a second direction opposite to the first direction.

According to an aspect of the present invention, the image processing apparatus further comprises a wireless transmitting unit for wireless-transmitting a signal for the graphic user interface to the remote controller.

It is to be understood that both the foregoing general description and the following detailed description are exemplary and explanatory and are intended to provide further explanation of the invention as claimed.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings, in which:

FIG. 2 is a control block diagram of an imaging system according to an embodiment of the present invention.

Figure 1:
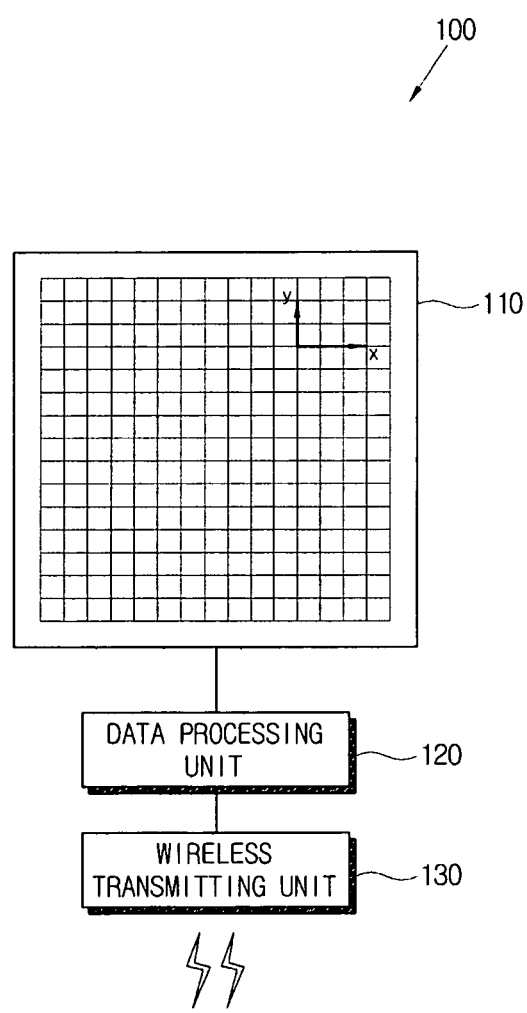
FIG. 1 is a control block diagram of a remote controller according to an embodiment of the present invention.

DETAILED DESCRIPTION OF THE
ILLUSTRATIVE, NON-LIMITING
EMBODIMENTS OF THE INVENTION

Reference will now be made in detail to the embodiments of the present invention, examples of which are illustrated in the accompanying drawings, wherein like reference numerals refer to like elements throughout. The embodiments are described below so as to explain the present invention by referring to the figures.

FIG. 1 is a control block diagram of a remote controller according to an embodiment of the present invention. A remote controller 100 of the present invention comprises a sensing unit 110, a data processing unit 120, and a wireless transmitting unit 130. Although not shown, the remote controller 100 may further comprise a control unit which controls the sensing unit 110, the data processing unit 120 and the wireless transmitting unit 130.

The sensing unit 110 has a two dimensional coordinate region and serves to sense a coordinate value that corresponds to the user's contact. If the sensing unit 110 is contacted with the user's finger, it accomplishes a mouse function which moves a pointer of a display unit in an external image processing apparatus by sensing a heat, pressure, or the like of the contacting portion.

If the user moves his/her finger while placing his/her finger on a display surface of the sensing unit 110, the pressure of a position pressed by the finger is converted to a voltage signal or current signal. The data processing unit 120 computes the position coordinate of the region touched by the finger based on the converted signal which is needed for the operations such as movement of cursor position or a pointer displayed at the external image processing apparatus, click of an icon, or movement of a scroll bar.

The sensing unit 110 is connected with the data processing unit 120 through a PS/2 interface to be able supply an input signal generated through user's operation to the data processing unit 120. It is noted that a type of the interface between the sensing unit 110 and the data processing unit 120 is not limited to the PS/2 if the sensing unit 110 can be connected with the data processing unit 120.

Such sensing unit 110 can be made by the known technology mentioned above. The sensing unit 110 need not sense the movement of the user's finger by actual touch; rather, the sensitivity of the sensing unit 110 may be set so as to sense the movement even if the user's finger is apart from the sensing unit 110 at a prescribed distance. Also, the portion of user's body for contacting the sensing unit 110 is not limited to the finger.

The data processing unit 120 detects a movement direction of the user's finger in accordance with a coordinate value sensed by the sensing unit 110, and converts it into a control signal which the wireless transmitting unit 130 can output. Since the coordinate value sensed from the sensing unit 110 contains information on user's contact and movement, it needs to convert the information into a signal which the external image processing apparatus can recognize. The information on the movement direction is generally converted into a form of infrared rays which is capable of wireless-transmitting and the signal outputted through the wireless transmitting unit 130 is received at a wireless receiving unit of the external image processing apparatus where it will be delivered to an system control unit of the image processing apparatus.

Such signal processing performed by the data processing unit 120 can be implemented in software or hardware manner and is not limited to particular data processing manner.

The wireless transmitting unit 130 transmits the control signal outputted from the data processing unit 120 to the external image processing apparatus.

Figure 3A:
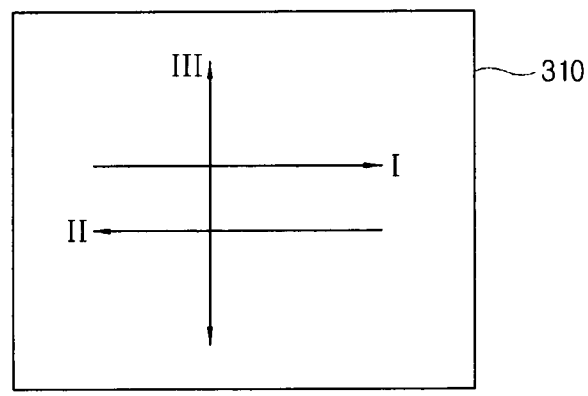
FIGS. 3A, 3B and 3C are diagrams showing a display unit for illustrating a control manner of an imaging system according to an embodiment of the present invention.
Figure 3B:
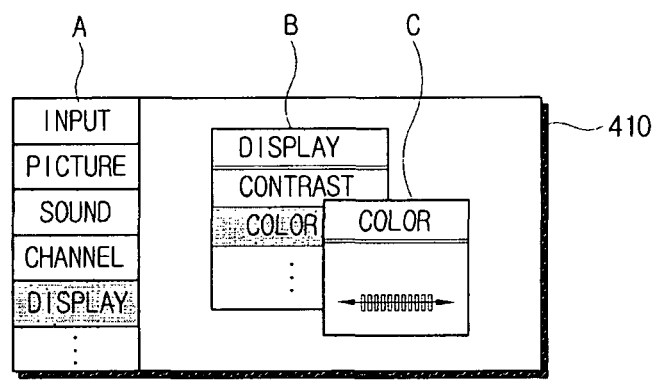
Figure 3C:
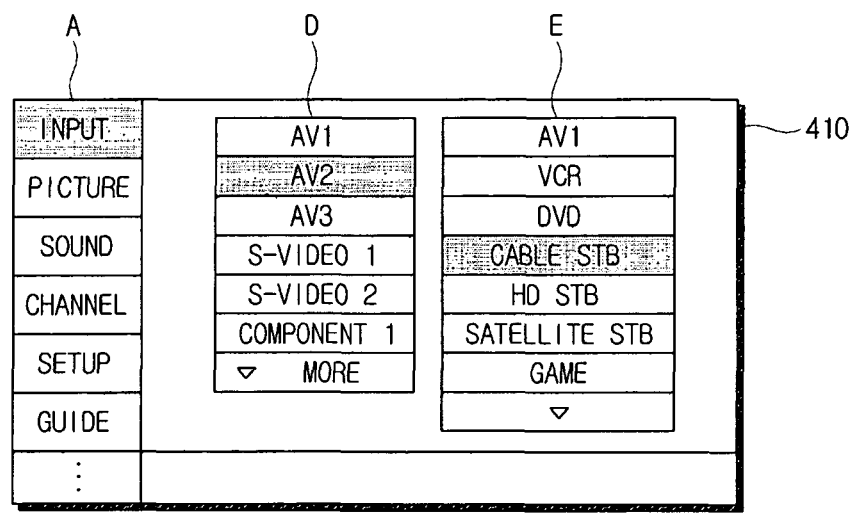

The display system according to an embodiment of the present invention will be described with reference with FIG. 2 and FIGS. 3A through 3C. FIG. 2 is a control block diagram of the imaging system, FIG. 3A is a diagram illustrating a movement of the user on the sensing unit 110, FIG. 3B is a diagram for illustrating an embodiment of the graphic user interface displayed at the display unit in accordance with the user's movement, and FIG. 3C is a diagram for illustrating another embodiment of the graphic user interface displayed at the display unit in accordance with the user's movement.

As shown in FIG. 2, the imaging system 200 includes a remote controller 300 and a display processing apparatus 400 which can be remotely controlled by the remote controller 300.

Although the television is exemplified as the display processing apparatus 400 in the display system 200 according to the present embodiment, it is not limited to the display apparatus such as the television, but includes all electronic machines having the display unit capable of displaying a graphic user interface. Since most electronic machines are generally produced and sold to be integrated with the remote controller for controlling it remotely, the present invention can be applied to the most electronic machine and remote controller.

Since the remote controller 300 according to this embodiment is configured similarly to the remote controller 100 shown in FIG. 1, the description on same components such as a sensing unit 310, a data processing unit 320 and the like will be omitted.

A sub display unit 340 displays the graphic user interface displayed at the display unit 410 of the image processing apparatus 400. The sub display unit 340 may be a liquid crystal panel and prepared as not only liquid crystal panel but also variable types of panel if it can display an image.

Thus, even if the user is placed in a position where he can not view the graphic user interface displayed at the display unit 410, he can control the image processing apparatus 400 through the remote controller 300 if he is placed in a location capable of wirelessly transmitting/receiving with the display apparatus 400. Further, since the user can view nearer image through the sub display unit 340, he can easily operate the sensing unit 310.

Such sub display unit 340 can be selectively omitted as a component which is prepared for user's convenience.

A first wireless transceiver 330 transmits the control signal of the remote controller 300 and receives a signal for the graphic user interface to be displayed at the sub display unit 340 while communicating with a second wireless transceiver 440 of the image processing apparatus 400.

The image processing apparatus 400 includes a display unit 410 which displays the graphic user interface, a user interface generating unit 420, a user interface control unit 430, and the second transceiver 440.

The display unit 410 includes a display module (not shown) on which the image is displayed, and a module driving unit (not shown) which displays the image on the display module by processing the image signal inputted from an image processing unit that is not shown. The display module of various types such as a DLP (Digital Light Processing), a LCD (Liquid Crystal Display), a PDP (Plasma Display Panel) and the like can be applied to the display module according to the present invention.

Here, if the DLP is applied to the display module, the module driving unit can include an optical engine, and if the LCD is applied to the display module, the module driving unit can include a printed circuit substrate which converts the signal inputted from the image processing unit into a data signal and a gate signal. Similarly, each display unit 410 may have a structure of corresponding module driving unit in accordance with the type of each display modules.

The user interface generating unit 420 generates the graphic user interface which displays selection lists for a plurality of display parameters and channels for determining the displaying state of the image displayed on the display unit 410.

The display parameter means items for determining the displaying state of the image displayed on the display unit 410, which may include a position parameter, a color temperature parameter, a resolution parameter, a clock and phase parameter, a contrast parameter, and a brightness parameter.

The user interface generating unit 420 according to the present embodiment is an OSD (on screen display) generating unit which is prepared in the image processing apparatus 400 to be controlled. According to another embodiment, the graphic user interface is not an OSD to be controlled in the image processing apparatus 400, but can be a screen that is displayed under a control of an external body that is connected to the image processing apparatus 400 through an interface unit. In such a case, the graphic user interface is generated and controlled by a program that is stored on the external body.

The user interface control unit 430 control the user interface generating unit 420 so that the graphic user interface may be displayed at the display unit 410 in correspondence with the control signal received from the remote controller 300.

The second transceiver 440 corresponding to the first transceiver 440 mentioned above receives the control signal to be outputted from the first transceiver 330 and supplies it to the user interface control unit 430, and outputs the signal for displaying the graphic user interface generated in the user interface generating unit 420.

Further, though not shown, the remote controller 300 further may include hot buttons for use in particular functions frequently used by the user, such as selections of television channels, muting of sound, a connection with an external machine and the like.

As shown in FIG. 3B, the graphic user interface includes a plurality of selection lists including a plurality of sub lists. That is, selection list such as an INPUT, a PICTURE, a SOUND, a CHANNEL and a DISPLAY is displayed at an "A window", and then a "B window" is displayed if the DISPLAY is selected from them. Selection list such as a CONTRAST, a COLOR and the like that are sub lists of the DISPLAY is displayed at the "B window". As such, since the selection list capable of being controlled through the graphic user interface is extended to the plurality of sub lists, it may cause inconvenience that the user must press a plurality of buttons in case of using existing remote controller.

In case of the remote controller 300 according to the present embodiment, it is possible to move between selection lists, or activate or select the selection list by user's operation as shown in FIG. 3A. For example, if the user moves his finger in a third direction (III), that is, up/down direction, the selection lists on the "A window" shown in FIG. 3B is activated or inactivated in accordance with the movement of the finger. Further, if the user performs the click operation by the user's finger, that is, the sensing unit 310 senses any contact with the user during a prescribed time period in a particular coordinate region, the activated selection list is selected so that the sub list of the list selected is displayed. As mentioned above, if the DISPLAY is selected in the "A window", the "B window" is displayed, and if the COLOR is selected in the "B window", the "C window" is displayed. If "C window" is displayed, the user can move his finger on the sensing unit 310 in a first direction (I), rightward or in a second direction (II), leftward in order to control the COLOR.

Further, when a plurality of windows is displayed (when the adjustment of the display parameter in the left or right direction is not needed or when another method is used for display parameter adjustment in the left or right direction), it is possible to move to lower-level selection lists if the user moves his finger in the first direction (I), and move to higher-level selection lists if he moves his finger in the second direction (II). In other words, the user may control to activate the higher-level or lower-level selection lists by moving his finger in the particular direction.

As shown in FIG. 3C, a "D window" which is lower-level list of the INPUT in the "A window" and an "E window" which is a lower-level list in the "D window" are displayed on the display unit 410. The user may activate the INPUT by moving his finger in the third direction (III) and selecting the INPUT through click, which displays the "D window". The user may activate AV2 by again moving his finger in the third direction (III) and selecting the AV2 through click, which displays the "E window." Furthermore the user may activate CABLE STB by again moving his finger in the third direction (III) and selecting CABLE STB through click.

According to another embodiment, the user do not click the selection list to select the selection list which he wants, but may perform the operation to move his finger leftward or rightward in a state that the selection list is activated. That is, when moving his/her finger leftward and rightward in the state that the selection list is activated, it is possible to select the selection item instead of moving to higher-level lists or lower-level lists. More specifically, when the user intends to select the CABLE STB in the "E window" in FIG. 3C, he needs only to move his finger in the first direction (I) instead of clicking the CABLE STB.

The user may double-clicks the sensing unit 310 to cause the graphic user interface to be displayed on the display unit 410. That is, he may contact the sensing unit 310 twice consecutively at a prescribed duration. As such, the control method may be established differently for various different remote controllers 300 in accordance with each situation.

As described above, the present invention can provide a remote controller, an image processing apparatus and an imaging system comprising the same which include a touch pad for enabling users to easily control a graphic user interface.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display system comprises:
   a remote controller with a touch pad which is capable of sensing a drag movement of a user's touch; and
   a display apparatus which is capable of displaying a graphic user interface showing a plurality of selection lists having a hierarchical structure based on the drag movement of the user's touch,
   wherein the display apparatus selectively activates a selection item among a plurality of selection items in one of the plurality of selection lists in accordance with the drag movement in an up or down direction,
   displays a higher-level selection list of the plurality of selection lists in accordance with a first drag movement in one of a left direction and a right direction, and
   displays a lower-level selection list of the plurality of selection lists in accordance with a second drag movement which is opposite to the first drag movement.

2. The display system according to claim 1, wherein the plurality of selection items are arranged in the up or down direction.

3. The display system according to claim 2, wherein the display apparatus selectively activates a selection item among a plurality of selection items in the higher-level selection list or the lower-level selection list in accordance with the drag movement in the up or down direction, and displays either a second higher-level selection list or a second lower-level selection list in accordance with the first or the second drag movement.

4. The display system according to claim 3, wherein the display apparatus highlights currently selected ones of the plurality of selection items of the selection lists and the higher-level selection list or the lower-level selection list in accordance with the drag movement in the up or down direction.

5. A method for controlling a display system comprising a remote controller and a display apparatus, the method comprises:
   sensing a drag movement of a user's touch on a touch pad of the remote controller; and
   displaying at the display apparatus a graphic user interface showing a plurality of selection lists having a hierarchical structure based on the drag movement of the user's touch,
   wherein the displaying comprises selectively activating a selection item among a plurality of selection items in one of the plurality of selection lists in accordance with the drag movement in an up or down direction,
   displaying a higher-level selection list of the plurality of selection lists in accordance with a first drag movement in one of a left direction and a right direction, and
   displaying a lower-level selection list of the plurality of selection lists in accordance with a second drag movement which is opposite to the first drag movement.

6. The method according to claim 5, wherein the plurality of selection items are arranged in the up or down direction.

7. The method according to claim 6, wherein the displaying further comprises selectively activating a selection item among a plurality of selection items in the higher-level selection list or the lower-level selection list in accordance with the drag movement in the up or down direction, and displaying either a second higher-level selection list or a second lower-level selection list in accordance with the first or the second drag movement.

8. The method according to claim 7, wherein the displaying further comprises highlighting currently selected ones of the plurality of selection items of the selection lists and the higher-level selection list or the lower-level selection list in accordance with the drag movement in the up or down direction.

9. The display system according to claim 3, wherein the second higher-level selection list or the second lower-level selection list is displayed in accordance with the first or the second drag movement which is input while the selection item is activated.

10. The display system according to claim 9, wherein the drag movement in the up or down direction and the first or the second drag movement in one of the left and right directions are continuous.

11. The method according to claim 7, wherein the second higher-level selection list or the second lower-level selection list is displayed in accordance with the first or the second drag movement which is input while the selection item is activated.

12. The method according to claim 11, wherein the drag movement in the up or down direction and the first or the second drag movement in one of the left and right directions are continuous.

* * * * *